UNITED STATES PATENT OFFICE.

JAMES JELLEY, OF COVENTRY, AND HENRY JELLEY, OF BIRMINGHAM, ENGLAND.

TOP OF CYCLE AND SIMILAR SADDLES.

1,376,547.  Specification of Letters Patent.  Patented May 3, 1921.

No Drawing.  Application filed July 6, 1918. Serial No. 243,723.

*To all whom it may concern:*

Be it known that JAMES JELLEY, resident of 41 Spon street, Coventry, England, and HENRY JELLEY, resident of "Westover," Selly Park, Birmingham, England, both subjects of the King of Great Britain, have invented certain new and useful Tops of Cycle and Similar Saddles, of which the following is a specification.

This invention has reference to the manufacture of the tops of cycle and similar saddles from composite or laminated material consisting of canvas or similar strong and supple textile fabric covered on both sides with india rubber.

Such saddle-tops are produced from the composite material by a known method which consists in shaping or molding a flat piece or "blank" of the said material (when the rubber constituent is in either a raw or a partially-vulcanized state) in suitable dies and under considerable pressure, and simultaneously subjecting the same to the action of heat to vulcanize, or complete the vulcanization of, the rubber.

According to the present invention, we produce the saddle-tops from blanks of composite material consisting of one or more layers of fabric embedded between layers or coverings of unvulcanized rubber of different "mixings." That is to say, each layer consists of raw rubber mixed or incorporated with such a different proportion of vulcanizing substance that when they are subsequently vulcanized by heat treatment during the shaping or molding of the blank, the two layers will have different characteristics as regards hardness and surface and susceptibility to climatic conditions.

Preferably, the upper layer which constitutes the seating surface of the saddle-top is a "mixing" which will produce, when vulcanized, a smooth and well finished surface to give a good appearance to the saddle, and which will not crack or deteriorate under the heat of the sun or of the body of the rider or under the act of perspiration of the latter, while the mixing of the under layer is of such a character that vulcanization will render this under layer harder or stiffer than the upper layer, and as this greater hardening of the under layer is produced during the time that the material is confined within the dies and is subjected to the shaping or molding pressure therein, it follows that, in the finished article, the said harder layer will constitute or serve as a stiffening medium that helps materially to preserve the shape of the said top when the saddle is in use.

The harder or stiffer layer may be of uniform thickness throughout, or it may be thicker at the middle or central portion (where the maximum stiffness or rigidity is desired) than at side portions from which the "skirts" of the saddle top are formed. Further, the textile layer or layers may be of a coarse or open-woven character so that parts of the upper and under rubber layers may be forced through the fabric and be made to meet or more or less mix with one another under the molding pressure.

The shaping and vulcanizing of the composite saddle tops may be conducted in two stages. The first stage consists in subjecting a suitably cut-out flat blank of the unvulcanized material to the pressure and action of flat molding tools or appliances which give a smooth surface to the upper and under rubber layers, force part of the said rubber into the fabric and shape or trim the edges, and while the flat blank is still under the pressure of the said molds, it is subjected to heat treatment for a period long enough to partially vulcanize the rubber constituents, in order to insure that, on the top-blank being taken from the molds, it will keep the smooth surface and preserve the sharpness or clearness of any ornamentations or the like that have been impressed thereon, pending the second stage of its treatment.

This second stage consists in shaping or molding the flat and partially-vulcanized blank to the finished shape between suitable dies and simultaneously subjecting the same to heat treatment for completing the vulcanization of the rubber. The periods during which the material may be subjected to heat treatment in both the preliminary and the finishing stages of manufacture may vary according to the nature of the mixings employed and other circumstances, but to mention a typical example which has proved to yield good results in practice, the preliminary vulcanization in the flat may be effected by subjecting the material to treatment for 18 or 20 minutes at 40 lbs. steam pressure and a temperature of 135° C., while the finishing vulcanization in the molding dies may be carried out under similar heat and steam pressure for about 50 minutes.

Having described our invention, what we claim and desire to secure by Letters Patent is:—

1. In a composite rubber and fabric top for cycle and like saddles the combination of an upper layer composed of a mixture of raw rubber and vulcanizing compound which when subjected to heat and pressure incidental to vulcanization will afford a yielding and flexible waterproof seating surface having a polished and well finished appearance and not tending to crack or deteriorate under heat or moisture, an under layer composed of a mixture of raw rubber and vulcanizing compound which upon being subjected to heat and pressure incidental to vulcanization will yield a relatively hard but flexible surface affording a comfortable seat and a support to the upper layer to preserve its shape, and a layer of textile fabric embedded in and intervening the said upper and under layers and acting in conjunction with the under layer to support the upper layer and resist any tendency of the latter to stretching and sagging.

2. A composite rubber and fabric top for cycle and similar saddles comprising upper and under layers and an interposed layer of stretch-resisting fabric; the rubber constituents of the upper and under layers being mixed with different proportions of vulcanizing compound so that when the composit material is shaped in pressure dies and simultaneously subjected to heat vulcanizing treatment, the resultant saddle top has a smooth finished seating surface and the rubber under layer constitutes a stiffening medium to preserve the shape.

3. In a composite rubber and fabric top for cycle and like saddles the combination of an upper layer composed of a mixture of raw material and vulcanizing compound which when subjected to a preliminary vulcanizing in flat dies for 18 to 20 minutes at a steam pressure of about 40 lbs. and a temperature of 135° C. and thereafter to a complete vulcanization by subjecting the partially vulcanized material to similar steam pressure and temperature in molding dies for amout 50 minutes will afford a yielding and flexible waterproof seating surface having a polished and well finished appearance and not tending to crack or deteriorate under heat or moisture an under layer composed of a mixture of raw rubber and vulcanizing compound which upon being subjected to a preliminary vulcanizing in dies for 18 to 20 minutes at a steam pressure of about 40 lbs. and a temperature of 135° C. and thereafter to a complete vulcanization by subjecting the partially vulcanized material to similar steam pressure and temperature in molding dies will yield a relatively hard and flexible surface affording a comfortable seat and a support to the upper layer to preserve its shape and a layer of textile fabric embedded in and intervening the said upper and under layers and acting in conjunction with the under layer to support the upper layer and resist any tendency of the latter to stretching and sagging.

4. A laminated saddle top for a cycle or similar saddle, comprising layers of vulcanized material differing in character after and by reason of their composition and the effect of vulcanization upon them.

5. A laminated saddle top for a cycle or similar saddle, comprising layers of vulcanized material of different character due to vulcanization of layers of vulcanizable materials differing in composition.

6. A laminated saddle top for a cycle or similar saddle, comprising an upper flexible smooth layer of vulcanized material and a relatively harder under-layer of vulcanized material, said materials differing in composition before vulcanization so that the latter affects them differently.

7. A cycle or similar saddle top of vulcanized material comprising an upper layer composed of a mixture of raw rubber and vulcanizing compound which when subjected to heat and pressure incidental to vulcanization affords a yielding and flexible waterproof seating surface having a polished and well finished appearance, and not tending to crack or deteriorate under heat or moisture, and an under-layer composed of a mixture of raw rubber and vulcanizing compound which when subjected to heat and pressure incidental to vulcanization yields a relatively hard but flexible surface affording a comfortable seat and a support to the upper-layer to preserve its shape.

Signed at Birmingham, England, this 7th day of June, A. D. 1918.

JAMES JELLEY.
HENRY JELLEY.